United States Patent
Sluys et al.

[11] Patent Number: 6,001,258
[45] Date of Patent: Dec. 14, 1999

[54] METHOD FOR REMOVING ORGANIC CONSTITUENTS FROM AN AQUEOUS STREAM

[75] Inventors: Johannes Theodorus Maria Sluys, Amersfoort; Jan Henk Hanemaaijer, Oosterbeek, both of Netherlands

[73] Assignee: Nederlandse Organisatie Voor Toegepast-Natuurwetenschappelijk Onderzoek (TNO), Delft, Netherlands

[21] Appl. No.: 08/952,453

[22] PCT Filed: May 22, 1996

[86] PCT No.: PCT/NL96/00208

§ 371 Date: Nov. 17, 1997

§ 102(e) Date: Nov. 17, 1997

[87] PCT Pub. No.: WO96/37272

PCT Pub. Date: Nov. 28, 1996

[30] Foreign Application Priority Data

May 22, 1995 [NL] Netherlands .......................... 1000411

[51] Int. Cl.[6] .................................................. B01D 61/00
[52] U.S. Cl. .......................... 210/650; 210/670; 210/651; 210/760; 210/748; 210/660; 210/663; 210/668
[58] Field of Search ..................................... 210/651, 670, 210/650, 760, 748, 660, 663, 668

[56] References Cited

U.S. PATENT DOCUMENTS

| | | | |
|---|---|---|---|
| 3,730,885 | 5/1973 | Makrides et al. ....................... | 210/670 |
| 4,101,296 | 7/1978 | Lowther ................................... | 204/130 |
| 4,749,492 | 6/1988 | Berrigan, Jr. et al. . | |
| 5,112,494 | 5/1992 | Yan ......................................... | 210/668 |
| 5,302,288 | 4/1994 | Meidl et al. ............................. | 210/668 |
| 5,364,534 | 11/1994 | Anselme et al. ........................ | 210/805 |
| 5,672,196 | 9/1997 | Acharya et al. ............................ | 95/97 |
| 5,702,587 | 12/1997 | Clifford et al. .......................... | 205/760 |

FOREIGN PATENT DOCUMENTS

| | | | |
|---|---|---|---|
| 0 439 856 | 8/1991 | European Pat. Off. . | |
| 0 611 249 | 8/1994 | European Pat. Off. . | |
| 27 43 683 | 3/1979 | Germany . | |
| 2825125 | 11/1979 | Germany ................................ | 210/670 |
| 33 31 475 | 3/1985 | Germany . | |
| 0129171 | 11/1978 | Japan ..................................... | 210/670 |
| 7809962 | 4/1980 | Netherlands ........................... | 210/670 |
| 543 890 | 12/1973 | Switzerland . | |

Primary Examiner—Ana Fortuna
Attorney, Agent, or Firm—Young & Thompson

[57] ABSTRACT

In order to remove organic constituents from an aqueous stream, the aqueous stream is combined with an adsorbent consisting of small particles to produce a dispersion in order to bind the contamination by adsorption on the small particles. The dispersion is concentrated to produce a slurry and the adsorbent is then regenerated by oxidation. The particles of the adsorbent are smaller than 200 $\mu$m and the oxidation can take place as partial oxidation at a temperature of between 25 and 130° C. and a pressure of between 1 and 3 bars. A reduction in volume of at least 90% is achieved on concentration to produce a slurry and the method is carried out continuously.

9 Claims, 1 Drawing Sheet

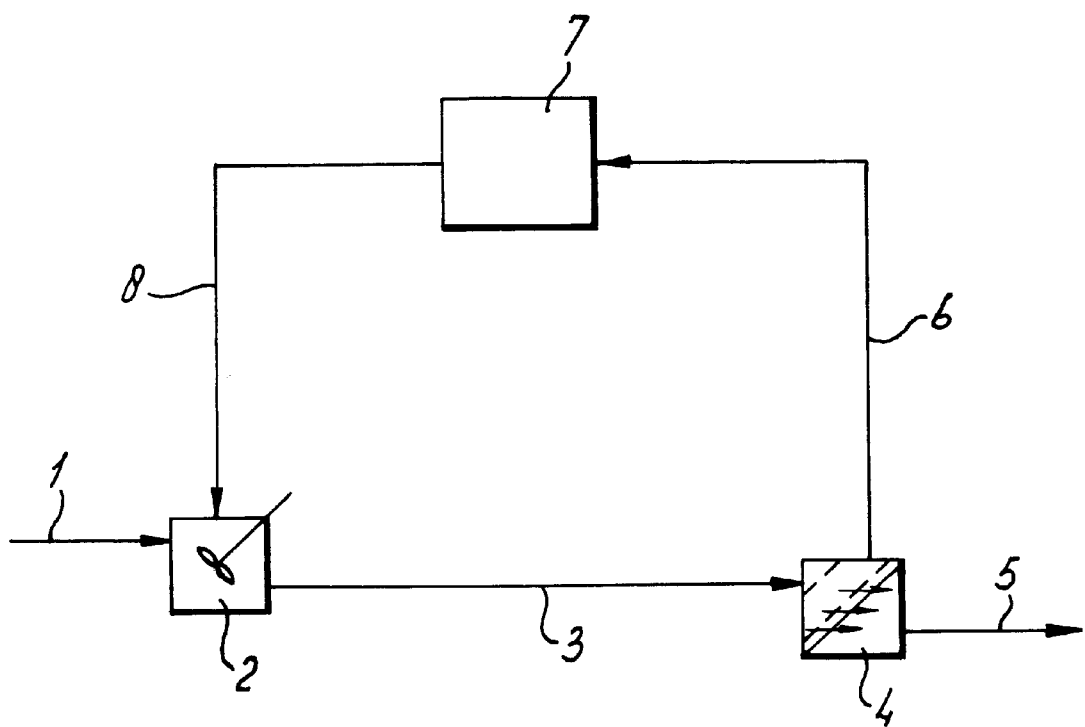

METHOD FOR REMOVING ORGANIC CONSTITUENTS FROM AN AQUEOUS STREAM

FIELD OF THE INVENTION

The invention relates to a method for removing organic and/or metallo-organic constituents from an aqueous stream, comprising in succession the following steps:

combining the aqueous stream with an absorbent consisting of small particles, to produce a dispersion in order to bind the contamination by adsorption on the small particles, concentration of the dispersion to produce a slurry, submitting the concentrated slurry to a regeneration step by oxidation.

BACKGROUND OF THE INVENTION

Water for the production of drinking water and for the food and pharmaceutical industries must be essentially free from insecticides, herbicides, chlorinated hydrocarbons, phenols, colorants, aroma substances and flavourings and other substances harmful or disagreeable to man. Governments also frequently demand that harmful organic components are removed from industrial effluents.

Physical adsorption on active charcoal is the technology most widely used for the removal of the above mentioned constituents, although extraction, distillation, membrane separation processes and biological processes can also be used to remove organic components from water. Active charcoal is a broad-spectrum adsorbent which can be used to remove undesirable components (colorants, aroma substances and flavourings and foaming agents) and to recover dissolved components by concentration. Active charcoal is characterized by a high specific surface area of 300–2500 m$^2$ per gram. There are two forms of active charcoal used as adsorbent in liquid phases: powdered charcoal and granular charcoal. The liquid to be treated is mixed with the charcoal particles, heated if necessary and, after a certain adsorption time, separated off by settling of the solid particles or by filtration. To an increasing extent powdered charcoal is being replaced by granular charcoal in connection with ease of handling, the absence of the need for filtration and the possibility of regenerating granular charcoal. The type of active charcoal chosen is determined by the desired physical and chemical properties. The most important physical parameters are specific surface area, pore size distribution, density, specific adsorption capacity, particle size, mechanical strength and resistance to attrition. The most important chemical properties are ash content, ash composition and pH. The customary procedure for regeneration of active charcoal is to heat the latter to a temperature of about 1000° C. Alternatively, regeneration can take place by steam stripping, with which method steam is passed through a bed of charcoal granules and volatile constituents are removed with the steam, solvent regeneration, with which method use is made of a solvent to extract adsorbed components from the charcoal, and wet air oxidation, with which method organic and inorganic compounds are oxidized with oxygen at a temperature of between 150° C. and 340° C. and a pressure of between 7 and 200 bar.

The use of granular charcoal for the removal of constituents from aqueous streams is associated with a number of drawbacks. Granular charcoal is microporous, virtually all of the extracting surface being located within the porous charcoal particles. The diffusion to an adsorption site within the pores is the determining factor for the rate. This process can take from only ten minutes to many hours. The actual adsorption step can go to completion in much less time, for example a few seconds to a few minutes. The slow reaction kinetics as a consequence of mass transfer limitations constitues a serious disadvantage. Another drawback is the loss of binding capacity as a consequence of clogging of pores. This is because active charcoal has a heterogeneous pore system, specified in more detail by macro-, meso- and micropores. As a result of pores being closed off by large molecules, some of the available adsorption capacity becomes inaccessible, which results in a reduction in the adsorption capacity. Finally, active charcoal adsorption can be employed mainly for apolar components. The effect of adsorption on active charcoal is thus dependent on the polarity of the components. Apolar components are firmly bound, whereas more polar components will adsorb to a much lesser extent.

If the removal process is carried out in a column, one is also confronted with the drawbacks that the adsorption capacity is poorly utilized as a consequence of the occurrence of preferential flow in a packed bed, that there is a need for pretreatment of the stream in connection with clogging of the column bed and that there is a question of low volumetric capacity as a consequence of low liquid flow rates in the column.

The disadvantage of the poor utilization of the absorption capacity can be avoided by making use of a fluidized bed. Moreover, no pretreatment is necessary in this case.

A significant disadvantage of existing methods for removing organic constituents from a n aqueous stream with the aid of granular charcoal is that there are no suitable techniques for regeneration of the granular charcoal in situ, i.e. on-line with the adsorption step.

A method of the type indicated in the preamble of the description is disclosed in DE-A 2 743 683. The disclosed method relates specifically to the treatment of effluent originating from the ammoxidation process for the preparation of acrylonitrile or an oxidized liquid obtained by wet oxidation of this effluent. Adsorption is carried out in three mixer-settlers connected in counter-current with long adsorption times (3 times 15 minutes). The method used for regeneration is exclusively wet air oxidation at pressures of between 15 and 150 bar and temperatures of between 150 and 300° C. The oxidation is very intensive and can lead to damage to the particles. As a matter of fact the adsorbent (at least 98% of the adsorbent) has a size lower than 0.04 μm.

SUMMARY OF THE INVENTION

The aim of the invention is to provide a method as indicated in the preamble which has a relatively high rate of reaction in the adsorption and regeneration stages without there being a risk of damage to the particles. Another aim of the invention is to be able to use efficient oxidation techniques for regeneration which, for practical and economic reasons, can not be used on a stream containing a low concentration of the components to be removed.

According to the invention, the method indicated in the preamble is, to this end, characterized in that the particles of the adsorbent are held captive in a closed system during, the particles of the adsorbent are smaller than 200 μm, a reduction in volume of at least 90% is achieved on concentration of the dispersion to produce a slurry, the regeneration by oxidation takes place at a temperature below 95° C. and a pressure of about 1 bar (atmospheric) and the method is carried out continuously.

In contrast to the customary regeneration methods, complete regeneration (restoration of the full adsorption capacity) and complete oxidative degradation to $CO_2$, $H_2O$ and salts is not necessary in a single step. As the particles are held captive in a closed membrane system, partial regeneration is possible. Long residence times are needed for complete regeneration. Partially oxidized components will be bound in the adsorption step and in the subsequent adsorption step will cyclically be oxidized further in the direction of $CO_2$, $H_2O$ and salts. Ultimately, organic impurities will be completely oxidized, there being no emission into the air or water of anything other than $CO_2$ and $H_2O$.

By making use, according to the invention, of very small adsorbent particles with substantially reduced transport distances in pores or, optionally, external surface exclusively, the "overall" rate of reaction in the adsorption and regeneration stages is substantially increased. By then concentrating the small particles (and thus increasing the concentration of the components absorbed thereon which are to be removed) by means of, for example, crossflow microfiltration or ultrafiltration or by using hydrocyclones or sieves or centrifuges or other suitable concentration techniques it is possible effectively to use oxidation techniques which, for practical and economic reasons, cannot be used on the feed stream containing a low concentration of components to be removed.

The adsorbents used can be either inorganic particles or organic constituents.

Inorganic particles are, for example, attapulgite clay, bentonite, diatomaceous earth, hornblende, kieselguhr, pumice, sand, aluminum oxide, aluminum silicate, various optionally modified zeolite materials, glass with controlled pores, hydrated titanium oxide, magnetic iron oxide, nickel silicon dioxide, silicochromium, stainless steel, titanium and zirconium hydroxide. Components of organic origin are, for example active charcoal, dextrans, cellulose, starch, pectin, crosslinked polystyrene/divinylbenzene, polyacrylamide, polyacrylate, polyacrylonitrile, polymethacrylate, nylon and polyolefins. In particular active powdered charcoal and zeolites are to be preferred.

Chemical oxidation, biological ozidation, photocatalytic oxidation, ozonisation and ultraviolet light are used for oxidation. For chemical oxidation use can be made of hydrogen peroxide, fluorine, permanganate, chlorine bleach and hypochlorite.

CH-A-543890 discloses a method for the regeneration of an adsorbent which has been loaded with organic and/or inorganic substances during water treatment. The adsorbent consists of relatively large charcoal-like particles (for example slightly smaller than 1 mm) and regeneration takes place by means of wet oxidation at a temperature between 105 and 200° C. and a pressure which must be sufficiently high to keep the water in the liquid phase (that is higher than 5.5 bar at 155° C). The oxidation process is not continuous.

The invention is explained in more detail with the aid of the figure which shows, diagrammatically, one embodiment of the method.

BRIEF DESCRIPTION OF THE FIGURE

FIG. 1. Represents the process of the invention.

DETAILED DESCRIPTION OF THE INVENTION

1=feed of the liquid to be treated.
2=mixing station for liquid and adsorbent,
3=transport line for mixture of liquid and adsorbent,
4=concentration unit (for example microfiltration),
5=liquid discharge line from unit 4,
6=transport line for the slurry of concentrated absorbent particles,
7=oxidation unit,
8=feed line for regenerated adsorbent to the mixing station 2.

The technology described has the following advantages:

substantial reduction in the adsorption time required (frequently reduced from hours to seconds) in connection with more rapid reaction kinetics compared with conventional granular charcoal adsorption as a result of the use of small particles substantial reduction in the contact time required for regeneration as a consequence of the short path for diffusion of oxidizing agent to the adsorption site and the lack of the need for complete oxidation of all organic constituents in a single step to $CO_2/H_2O$/salts, the possibility of carrying out the oxidative regeneration in a much more attractive concentration range as a result of the concentration step, with, as a consequence, a reduction in the quantity of oxidizing agent required, a compact set-up which is also suitable for relatively small applications (in contrast to large-scale processes for regeneration and the associated high capital investment), the possibility for on-line regeneration, re-use of the adsorbent, the total absence of emissions into the environment, the production of water of very good quality.

Within the framework of the invention, a number of variants are, of course, possible, for example in respect of the techniques used for concentration of the adsorbent particles loaded with (metallo)organic components. Conceivable techniques in this context are the use of conventional filters, membrane filtration systems, hydrocyclones, centrifuges, magnetic systems, continuous sand filters and other techniques for the removal of particles from liquid streams.

EXAMPLE 1

A feed stream which contains 0.06 mmol/l caffeine is brought into contact with powdered charcoal (Norit, type W35) and, after a reaction time of ≈30 seconds, is passed over a polymer hollow fibre module (Romicon, type HFL-45-XM50, MWCO 50 000 D). No caffeine can be detected in the permeate, which corresponds to a caffeine concentration of <0.001 mmol/liter. During concentration of the powdered charcoal suspension from 0.1% by weight to 15% by weight, the flow rate remains virtually unchanged at about 300 l/m².hour.bar. The maximum adsorption capacity of powdered charcoal, type W35, for caffeine was determined as 0.3 mmol/g. The powdered charcoal slurry is then fed to a regeneration unit where concentrated hydrogen peroxide is fed in. The evolution of gas as a consequence of oxidation activity is observed.

EXAMPLE 2

A feed stream which contains 40 ppb atrazine is brought into contact with powdered charcoal (Norit, type W35) and, after a reaction time of ≈30 seconds, is passed over a polymer hollow fibre module (Romicon, type HFL-45-XM50, MWCO 50 000 D). No atrazine can be detected in the permeate, which corresponds to an atrazine concentration of <0.1 ppb. The powdered charcoal slurry is then fed to a regeneration unit where concentrated hydrogen peroxide and Fenton's reagent (iron sulphate) are fed in. A vigorous evolution of gas as a consequence of oxidation activity is observed.

EXAMPLE 3

100 ml of a 5 mM caffeine solution is brought into contact with 5 grams carbon black (type Monarch 880). Within 30 seconds it is no longer possible to detect any further caffeine in the solution (conc. <0.001 mmol/l) and complete adsorption of caffeine has taken place. The adsorption capacity of various carbon blacks for caffeine has been determined as: 0.22 mmol/g for carbon black, type VXC 72 and 0.17 mmol/g for carbon black, type Monarch 880. The carbon blacks are concentrated by centrifuging at 20 000 G for 30 minutes.

EXAMPLE 4

In a graduated tube, a caffeine solution is fed batchwise into a mixture of $TiO_2$ (2 g/l, Degussa), demineralized water and powdered charcoal (Norit W35), the various constituents are brought into intimate contact with one another and the whole is then introduced into a UV-A exposure apparatus (exposure intensity $\approx 50$ W/m$^2$) for 10 minutes. The loading capacity determined corresponds to the maximum loading capacity, which indicates that under the given conditions no or hardly any regeneration of the powdered charcoal surface takes place by means of photocatalytic oxidation.

An experiment carried out with 25 ml 2 g/l $TiO_2$, 5 ml 0.5 mM caffeine solution and 20 ml demineralized water, without powdered charcoal, shows about 90% degradation of caffeine after exposure for 10 minutes.

EXAMPLE 5

A feed stream which contains Procion Blue is brought into contact with powdered charcoal (Norit, type W35) and, after reaction time of $\approx 30$ seconds, is fed over a ceramic microfiltration module (SCT, $Al_2O_3$, pore size 0.2 $\mu$m) and concentrated to 130 g powdered charcoal/liter and is then fed to a regeneration unit where a concentrated hydrogen peroxide solution and Fenton's reagent ($Fe^{2+}/Fe^{3+}$) are fed in. Apart from regeneration of the powdered charcoal surface by oxidation of Procion Blue, the formation of very small powdered charcoal fraction (<0.5 $\mu$m) as a result of oxidation of the powdered charcoal itself is also visually discernible.

EXAMPLE 6

One liter of a 1 g/l powdered charcoal suspension (Norit W35) fully loaded with caffeine (loading=0.3 mmol/g) is located in a tank and is aerated with ozone. The gas settings are as follows: 25 mg $O_3/m^3$, 100 l/h and 0.6 bar. A substantial reduction in the size of the powdered charcoal particles as a result of oxidation of the powdered charcoal itself is visually discernible.

EXAMPLE 7

100 ml of a 0.05 M solution of Procion Blue (molecular weight 840.1) are brought into contact with 0.7 g zeolite Y (PQ zeolite bv, type CBV-780 ($SiO_2/Al_2O_3$=80), specific surface area 780 m$^2$/g, crystal size 0.3–0.5 $\mu$m, density: 1.9–2.0 kg/l pore diameter: $\approx 0.74$ nm). A blue coloration of the zeolite particles is observed. After adding 20 ml concentrated hydrogen peroxide (30%) and 5 ml 1 mM $Fe_2SO_4$, the formation of gas bubbles ($CO_2$) can be visually detected, as can also the disappearance of the blue colour from the supernatant liquid and a white coloration of the zeolite particles, such that there is no discernible difference between these particles and zeolite particles which have not been regenerated. There is no indication of the loss of zeolite particles as a result of possible oxidation (no degeneration).

EXAMPLE 8

In a set-up for continuous microfiltration, a solution of 0.1 mmol.l$^{-1}$ Procion Blue is added to a total of 40 grams zeolite material, to give a loading of about 0.04 mmol.g$^{-1}$. The flow rate is 0.45 m$^3$.m$^{-2}$.h$^{-1}$.bar$^{-1}$. Regeneration is then carried out by means of a 6-fold excess of peroxide (with Fenton's reagent) at 22° C. Renewed adsorption of Procion Blue then shows the same breakthrough curve and loading, indicating complete regeneration without degradation of the zeolite material itself. The same picture is obtained when this procedure is repeated twice.

EXAMPLE 9

The experiment from Example 8 is repeated using a fresh batch of zeolite material and caffeine as the model organic micropollutant. The flow rate is significantly higher; approximately 1.35 m$^3$.m$^{-2}$.h$^{-1}$.bar$^{-1}$. Breakthrough occurs at about 50% of the loading capacity (0.38 mmol.g$^{-1}$), after which regeneration is carried out. For complete regeneration it is now found to be necessary to use a 30-fold excess of peroxide and to raise the temperature to 85° C. Once again, no clear degradation of the zeolite material can be detected.

We claim:

1. In a method for removing organic and/or metallo-organic constituents from an aqueous stream, comprising in succession the following steps:

combining the aqueous stream with an adsorbent consisting of small particles, to produce a dispersion in order to bind the constituents by adsorption on the small particles;

concentrating the dispersion to produce a slurry;

subjecting the concentrated slurry to a regeneration step by oxidation;

the improvement wherein:
the particles of the adsorbent are held captive in a closed system;
the particles of the adsorbent are smaller than 200 $\mu$m;
the dispersion undergoes a volume reduction of at least 90% during concentration to produce the slurry;
the regeneration by oxidation takes place at a temperature below 95° C. and a pressure of about 1 bar (atmospheric); and
the method is carried out continuously.

2. Method according to claim 1, wherein the step of concentrating the dispersion is carried out by one of ultrafiltration and microfiltration.

3. Method according to claim 1, wherein the step of concentrating the dispersion is carried out by at least one hydrocyclone.

4. Method according to claim 1, wherein the step of concentrating the dispersion is carried out by a continuous sand filter.

5. Method according to claim 1, wherein the adsorbent comprises zeolites.

6. Method according to claim 1, wherein the adsorbent comprises active charcoal.

7. Method according to claim 1, wherein a chemical oxidizing agent is used for the oxidation.

8. Method according to claim 7, wherein the chemical oxidizing agent comprises hydrogen peroxide.

9. Method according to claim 1, wherein the oxidation is carried out by one of a biological oxidation of photocatalytic oxidation, ozonation, and ultraviolet light.

* * * * *